3,538,131
16α-METHYL-6α-FLUORO DERIVATIVES OF REICHSTEIN SUBSTANCE S
Howard J. Ringold, Carl Djerassi, and John Edwards, Mexico City, Mexico, assignors, by mesne assignments, to Syntex Corporation, a corporation of Panama
No Drawing. Filed Jan. 27, 1959, Ser. No. 789,242
Claims priority, application Mexico, July 9, 1958, 51,522; Sept. 6, 1958, 52,051; Sept. 24, 1958, 52,202; Dec. 11, 1958, 53,047
Int. Cl. C07c 169/32
U.S. Cl. 260—397.47
8 Claims The present invention relates to novel cyclopentanophenanthrene compounds.

More particularly the present invention relates to novel 6α-fluoro-16α-methyl derivatives of cortisone, hydrocortisone, prednisone and prednisolone including derivatives further substituted by 9α-chloro, fluoro or bromo as well as 21-mono esters of these compounds. All of the foregoing compounds are active cortical hormones having marked anti-inflammatory activity. The present invention also relates to certain novel intermediates for the production of these compounds and especially 16α-methyl-6α-fluoro derivatives of substance "S."

The novel cortical hormones and intermediates of the present invention are illustrated in part by the following formulas:

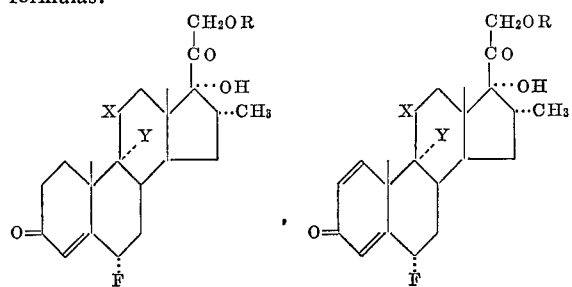

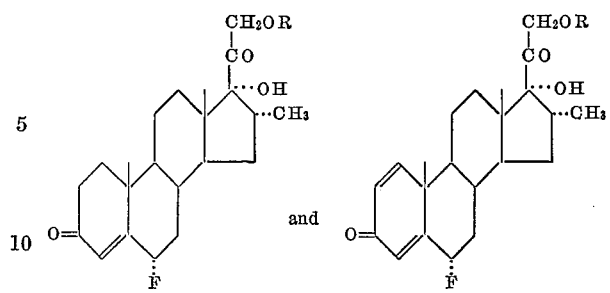

In the above formulas X represents =O or

Y represents hydrogen, fluoro, chloro or bromo and R represents hydrogen or a hydrocarbon carboxylic acyl group of less than 12 carbon atoms, including saturated or unsaturated, straight or branched chain aliphatic, cyclic or cyclic-aliphatic which may be conventionally substituted with hydroxyl or halogen for example. Examples of such acyl groups are acetate, propionate, t-butyrate, hemisuccinate, enanthate, caproate, benzoate, trimethylacetate, phenoxyacetate, phenylpropionate, cyclopentylpropionate and β-chloropropionate.

The novel compounds above set forth are prepared by a process illustrated in part by the following equation:

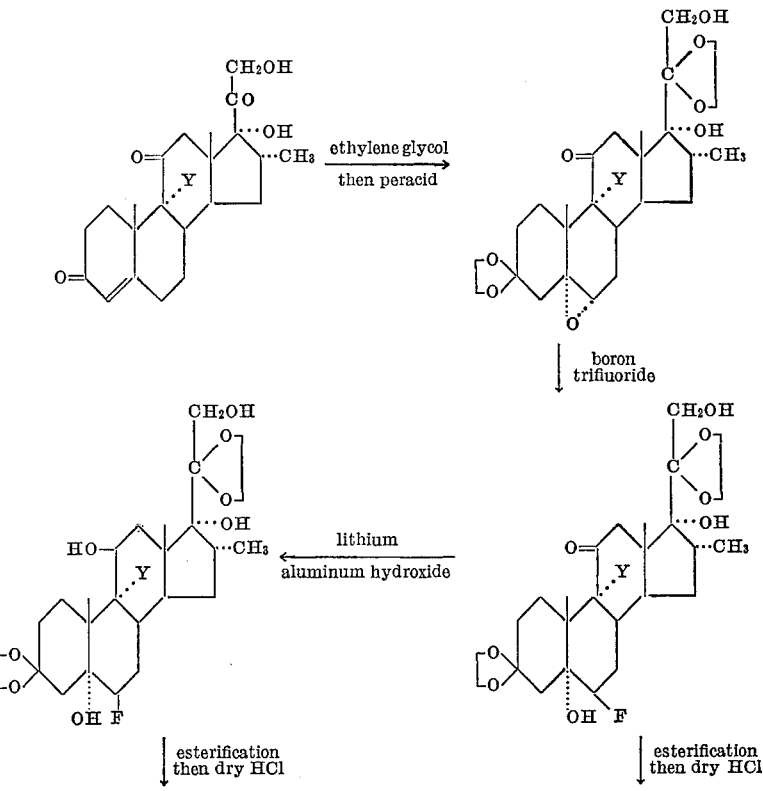

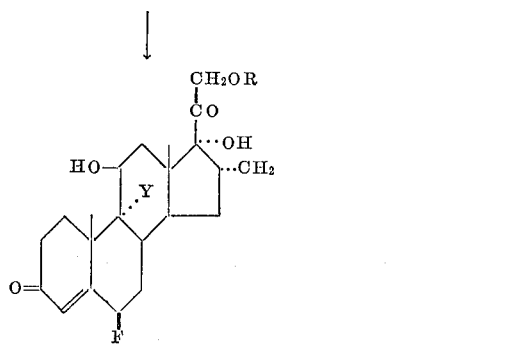

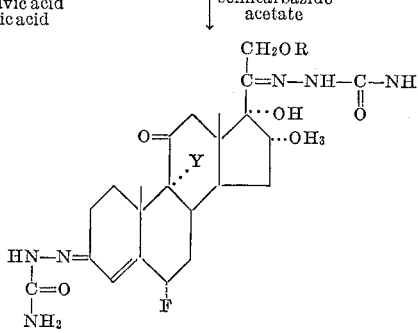

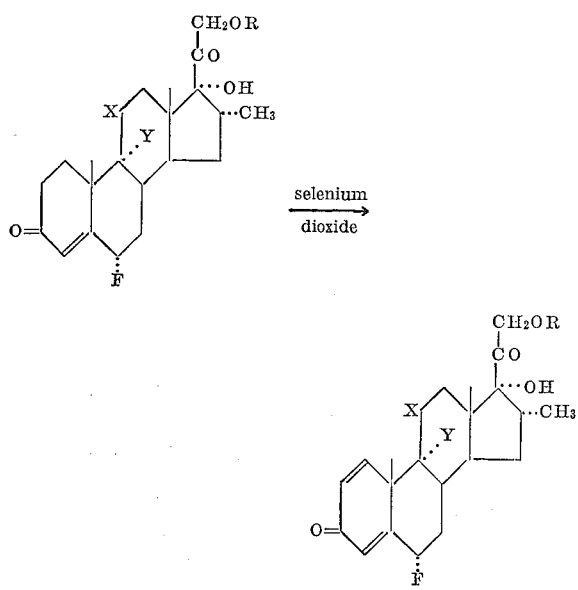

In the above equations X, Y and R represent the same groups as heretofore set forth.

In practicing the process above outlined, the starting material namely 16α-methyl-cortisone or derivatives thereof having a 9α-chloro, bromo or fluoro group prepared as set forth in U.S. application of Djerassi and Ringold, Ser. No. 789,248 filed as of even date herewith, now abandoned is treated with a lower alkyleneglycol such as ethylene glycol in an organic solvent as for example benzene and in the presence of p-toluenesulfonic acid to form the corresponding 3,20-bis-cycloalkyleneketal such as the 3,20-bis-cycloethyleneketal. The double bond which migrated to the C–5(6) position was then epoxidized by reaction with a peracid to form the illustrated 3,20-bis-cycloethyleneketal of 16α-methyl-5α,6α-oxido-pregnan-17α,21-diol-11-one or the 9α-halo derivatives. Treatment of these last compounds with boron trifluoride etherate in ether-benzene gave the corresponding 5α-hydroxy-6β-fluoro-11-keto compounds. Reduction of the 11-keto group with lithium aluminum hydride gave the corresponding 11β-hydroxy derivatives and conventional esterification at C–21 of either the 11-keto or 11β-hydroxy compounds followed by vigorous acid treatment gave the corresponding 6α-fluoro compounds including the reconstituted 3 and 20 keto groups. Preferably the vigorous acid treatment was with a stream of dry hydrogen chloride introduced into a glacial acetic acid solution of the compounds at about 15° C. In this way there was formed the 21-esters preferably the acetates of 16α-methyl-6α-fluoro-cortisone, the indicated 9α-halo derivatives thereof and of 16α-methyl-6α-fluoro-hydrocortisone and its indicated 9α-halo derivatives. These esters were hydrolyzed to the free alcohols by conventional mild alkali treatment and 21-esters were prepared by conventional treatment of the free compounds with acid anhydrides or chlorides of hydrocarbon carboxylic acids of up to 12 carbon atoms.

As illustrated above a modification involved the reaction of the free 16α-methyl-6α-fluoro-cortisone with semicarbazide acetate to form the 3,20 - bis-semicarbazone derivatives thereof, the treatment of the semicarbazone with sodium borohydride to reduce the 11-keto group to the 11β-hydroxy group and treatment with pyruvic acid in admixture with acetic acid and then acetic anhydride to form the 21-acetate of 16α-methyl-6α-fluorohydrocortisone. By conventional hydrolysis the acetate was converted to the free compound and by conventional esterification the 21-esters thereof were prepared.

The Δ⁴ compounds thus prepared were as indicated transformed into the corresponding Δ¹,⁴-derivatives by the treatment thereof with selenium dioxide, preferably by refluxing in t-butanol in the presence of pyridine. Although the free compounds may be used in this reaction the 21-esters are preferably used and the 21-esters of the Δ¹,⁴-derivatives thereafter conventionally hydrolyzed to form the free alcohols. Other methods such as the known incubation with corynebacterium simplex may also be used for the conversion of the Δ⁴-compounds to corresponding Δ¹,⁴-derivatives.

Another method for the preparation of the 21-acetate of 16α-methyl-6α-fluoro-cortisone is illustrated by the following equation:
In the above equation Ac represents acetate and $R_1$ represents hydrogen or acetate.
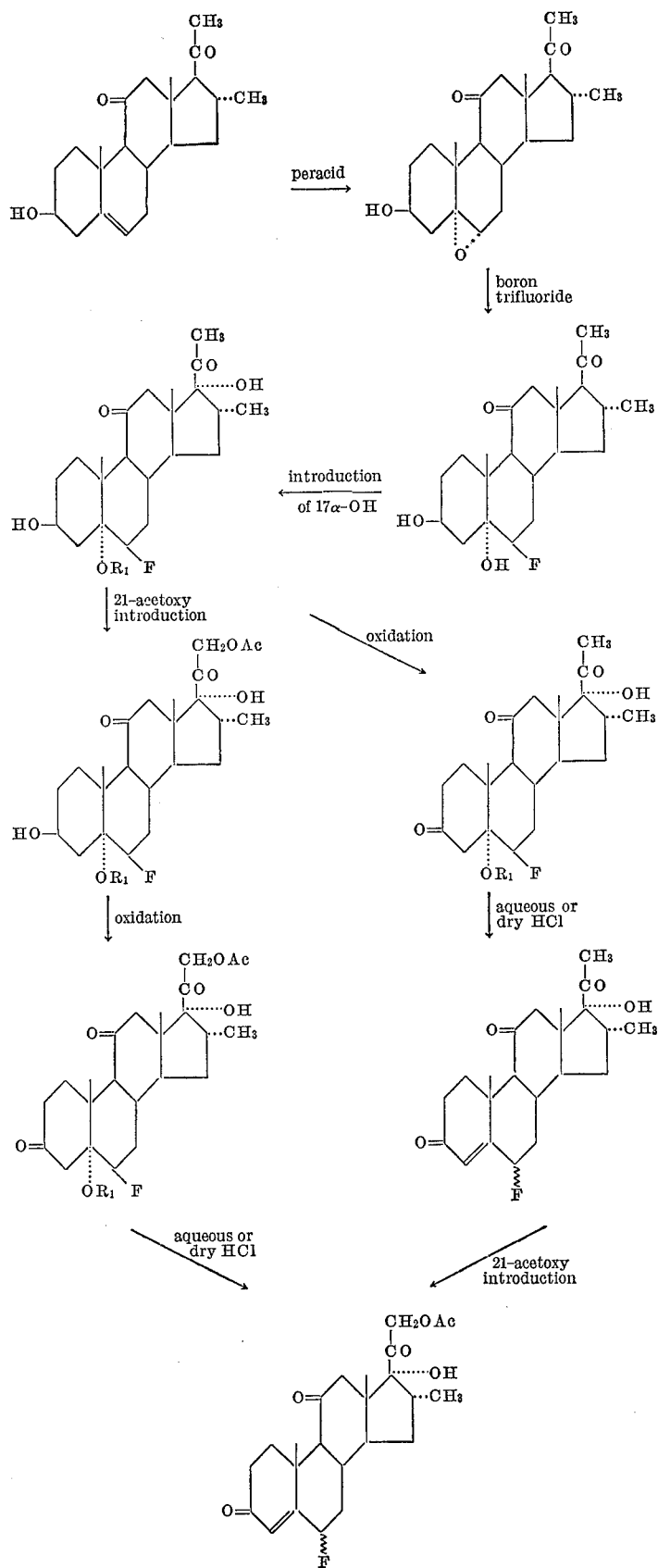

In practicing the process above set forth 16α-methyl-Δ⁵-pregnen-3β-ol-11,20-dione which has been prepared as set forth in the application of Djerassi and Ringold, Ser. No. 789,243, filed as of even date herewith, now abandoned was epoxidized by reaction with a peracid such as perbenoic or permonophthalic to form 16α-methyl-5α,6α-oxido-pregnan-3β-ol-11,20 - dione. Treatment of this compound with boron trifluoride preferably in the form of its etherate and in mixture with ether and benzene produced 16α - methyl - 6β-fluoro-pregnan-3β,5α-diol-11,20-dione. The 17α-hydroxy group was then introduced in a conventional way i.e., the last mentioned compound was heated with acetic anhydride in the presence of p-toluenesulfonic acid to form 16-methyl-6β-fluoro-Δ¹⁷⁽²⁰⁾-pregnen-3β,5α,20 - triol - 11-one triacetate; the double bond was epoxidized by reaction with a peracid and the resulting 16α - methyl - 6β - fluoro - 17α,20 - oxido - pregnan-3β,5α,20-triol-11-one triacetate was subjected to alkaline treatment. Under mild conditions such as 1% methanolic potassium hydroxide solution at room temperature 16α-methyl-6β-fluoro-pregnan-3β,5α,17α - triol-11,20-dione 5-acetate was formed, stronger conditions such as refluxing for 4 hours gave the corresponding free compound.

For the introduction of the 21-acetoxy group the compounds just described were transformed into their 21-iodo derivatives, either directly by reaction with iodine and calcium oxide in admixture with tetrahydrofurane and methanol or indirectly by C-21 monobromination followed by reaction of the 21-bromo compound with sodium iodide. The resulting compounds 16α-methyl-6β-fluoro-21-iodo-pregnan-3β,5α,17α-triol-11,20-dione or the 5-acetate thereof were then reacted with potassium acetate in acetone to prepare the corresponding 21-acetoxy derivatives.

Oxidation of the 3β-hydroxy group of these compounds with chromic acid gave 16α-methyl-6β-fluoro-pregnan-5α,17α,21-triol-3,11,20-trione 21-acetate or 5,21 - diacetate and treatment of these compounds with small amounts of aqueous concentrated hydrochloric acid in acetic acid solution gave 16-methyl-6β-fluoro-cortisone 21-acetate. Treatment of this compound with dry hydrogen chloride in glacial acetic acid inverted the steric configuration at C-6 and gave the previously described 16α-methyl-6α-fluoro-cortisone 21-acetate. Instead of the last two steps the one step treatment of the 5α-hydroxy 6β-fluoro compounds with dry hydrogen chloride in glacial acetic acid gave both inversion and dehydration.

Instead of subjecting 16α-methyl-6β-fluoro-pregnan-3β,5α,17α-triol-11,20-dione (or its 5-acetate) to the steps of acetoxylation at C-21, oxidation at C-3, dehydration at C-5 and inversion at C-6, the sequence of these operations can be altered: the 3β-hydroxyl group can first be oxidized with chromic acid to produce 16α-methyl-6β-fluoro-pregnan-5α,17α-diol-3,11,20-trione the above compounds were then dehydrated by reaction with aqueous concentrated hydrochloric acid to form 16α-methyl-6β-fluoro-21-desoxy-cortisone, the steric configuration at C-6 was then inverted by the treatment with dry hydrogen chloride; either before or after this inversion, 16α-methyl-6α-fluoro-21-desoxy-cortisone was acetoxylated by known methods.

The production of novel intermediates for the production of the cortical hormones of the present invention is illustrated in the following equation:

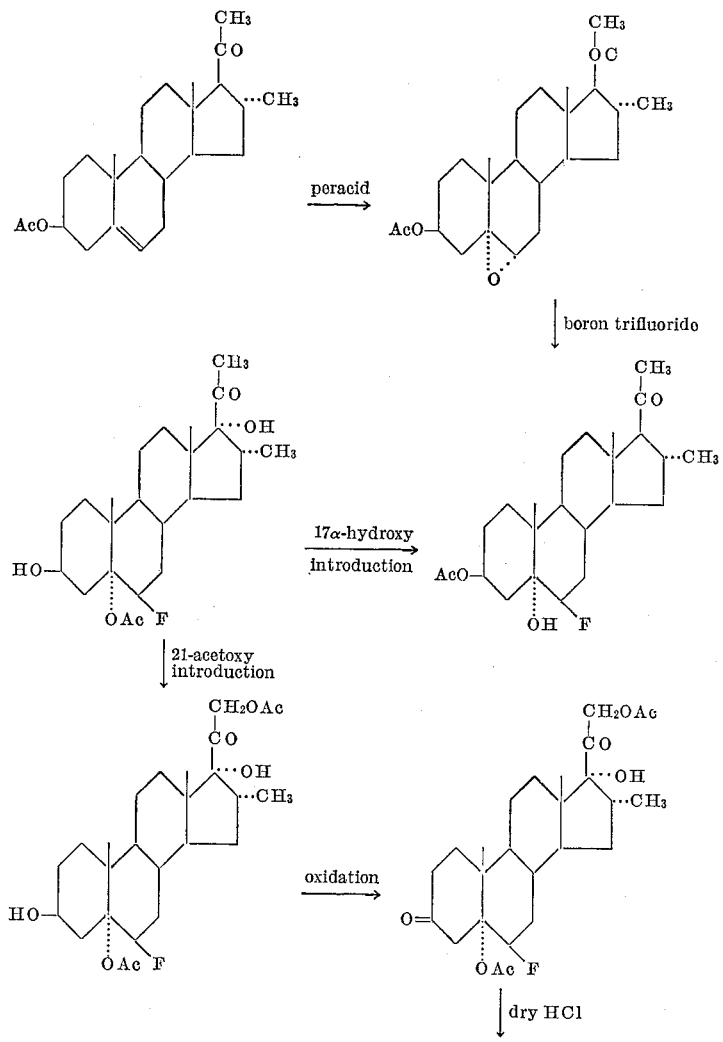

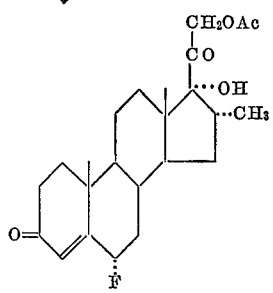

In the above equation Ac represents acetate.

In practicing the process above outlined the starting material was the known 16α-methyl-Δ⁵-pregnen-3β-ol-20-one acetate. Its double bond was epoxidized by reaction with a peracid, such as monoperphthalic acid or perbenzoic acid, and thus there was obtained 16α-methyl-5α, 6α-oxido-pregnan-3β-ol-20-one acetate; the latter was treated with boron trifluoride etherate in mixture with ether and benzene, following the method described in U.S. application Ser. No. 753,629, filed Aug. 7, 1958. There was thus produced 16α-methyl-6β-fluoro-pregnan-3β,5α-diol-20-one 3-acetate. A hydroxyl group was introduced at C–17α of this compound by the method of Gallagher and Kritchevsky (J. Am. Chem. Soc., 73, 184 (1951)) i.e. by slow distillation of a solution of the compound in acetic anhydride, in the presence of p-toluenesulfonic acid, there was obtained 16α-methyl-6β-fluoro-Δ¹⁷⁽²⁰⁾-pregnan-3β,5α,20-triol triacetate; this was epoxidized to 16α-methyl-6β-fluoro-17,20-oxido-pregnan-3β,5α,20-triol triacetate by reaction with a peracid; the latter was then converted by alkaline treatment into 16α-methyl-6β-fluoro-pregnan-3β,5α,17α-triol-20-one 5-acetate.

The above compound was monobrominated at C–21, preferably in dioxane solution; the bromine atom was substituted for iodine by treatment with sodium iodide in ethanol solution and the resulting 16α-methyl-6β-fluoro-21-iodo-pregnan-3β,5α,17α-triol-20-one 5-acetate was acetoxylated to produce 16α-methyl-6β-fluoro-pregnan-3β,5α,17α,21-tetrol-20-one 5,21-diacetate by refluxing with potassium acetate in mixture with acetone. The 3β-hydroxyl group was oxidized to the keto group, preferably by reaction of an acetone solution of the steroid with an 8N solution of chromic acid in dilute sulfuric acid, at low temperature and under an atmosphere of nitrogen; there was thus obtained 16α-methyl-6β-fluoro-pregnan-5α,17α,21-triol-3,20-dione 5,21-diacetate. Upon treatment with dry hydrogen chloride in glacial acetic acid solution, there was converted the 3-keto-5α-acetoxy grouping into the Δ⁴-3-keto grouping and the steric configuration at C–6 was inverted to produce the desired 16α-methyl-6α-fluoro-Δ⁴-pregnen-17α,21-diol-3,20-dione 21-acetate.

Obviously, the order of the above reactions can be modified to first oxidize the 3β-hydroxyl group of 16α-methyl-6β-fluoro-pregnan-3β,5α,17α-triol-20-one 5 - acetate to the keto group by means of the reaction with 8N chromic acid, then there was produced 16α-methyl-6α-fluoro-Δ⁴-pregnen-17α-ol-3,20-dione by the reaction with dry hydrogen chloride and the acetoxyl group at C–21 was introduced, in this case preferably by monoiodination at C–21 with iodine and calcium oxide followed by acetolysis with potassium acetate in mixture with acetone.

The various steps above set forth may be performed with other reagents. For example, the double bond of the starting compound can be epoxidized either with perbenzoic acid in chloroform solution or with permonophthalic acid in ether-chloroform solution, and the latter reagent can be employed for the epoxidation at C–17,20 instead of the aforementioned reaction with perbenzoic acid in benzene solution; the bromination at C–21 can be effected either in chloroform solution or in a mixture of chloroform and acetic acid; the treatment with dry hydrogen chloride can be substituted by treatment with any other acid sufficiently strong to cause the inversion of the steric configuration at C–6 and the elimination of the elements of acetic acid, such as for example with hydrogen fluoride; the method mentioned of monoiodination at C–21 followed by acetolysis can also be used for the C–21-acetoxylation of 16α-methyl-6β-fluoro-5α-acetoxy-pregnan-3β,17α-diol-20-one, or the 21-bromo compound can be converted into the 21-acetoxy compound without isolating the intermediate 21-iodo compound.

The method above set forth is also suitable for the preparation of the important pregestational hormone 16α-methyl-6α-fluoro-17α-acetoxy-progesterone. For preparing this compound it is necessary to esterify the two hydroxyl groups of 16α-methyl-6β-fluoro-pregnan-3β,5α,17α-triol-20-one 5-acetate. The acetate group at C–3 of the resulting 3,5,17-triacetate is selectively hydrolyzed to obtain 16α-methyl-6β-fluoro-pregnan-3β,5α,17α - triol - 20 - one 5,17-diacetate. The subsequent oxidation of the 3β-hydroxyl group to a keto group, followed by the treatment with dry hydrogen chloride in glacial acetic acid gives 16α-methyl-6α-fluoro 17α - acetoxy - progesterone. If the compound is further acetoxylated at C–21 by the aforementioned method, the final product obtained is 16α-methyl-6α-fluoro-Δ⁴-pregnen-17α,21-diol-3,20-dione 17,21-diacetate. Instead of introducing an acetate group at C–17, there can be introduced the residue of any other hydrocarbon carboxylic acid of up to 12 carbon atoms.

It may be noted further that the final product of the process above set forth namely 16α-methyl-6α-fluoro-Δ⁴-pregnen-17α,21-diol-3,20-dione 21-acetate upon conventional hydrolysis with alkali gave the free compound and conventional esterification of this free compound with acid anhydrides or chlorides of hydrocarbon carboxylic acids of less than 12 carbon atoms gave the corresponding 21-monoesters.

The conversion of 16α-methyl-6α-fluoro-Δ⁴-pregnen-17α,21-diol-3,20-dione into previously referred to cortical hormones is illustrated by the following equation:

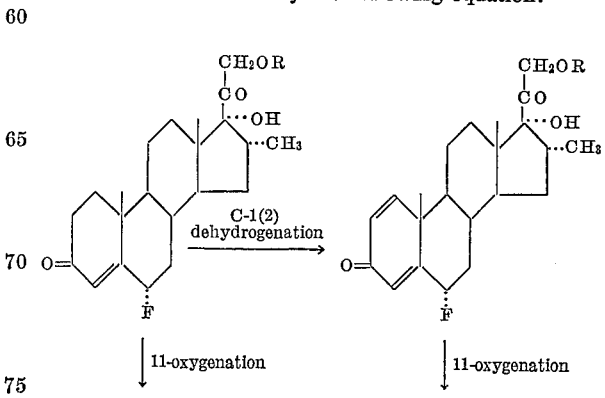

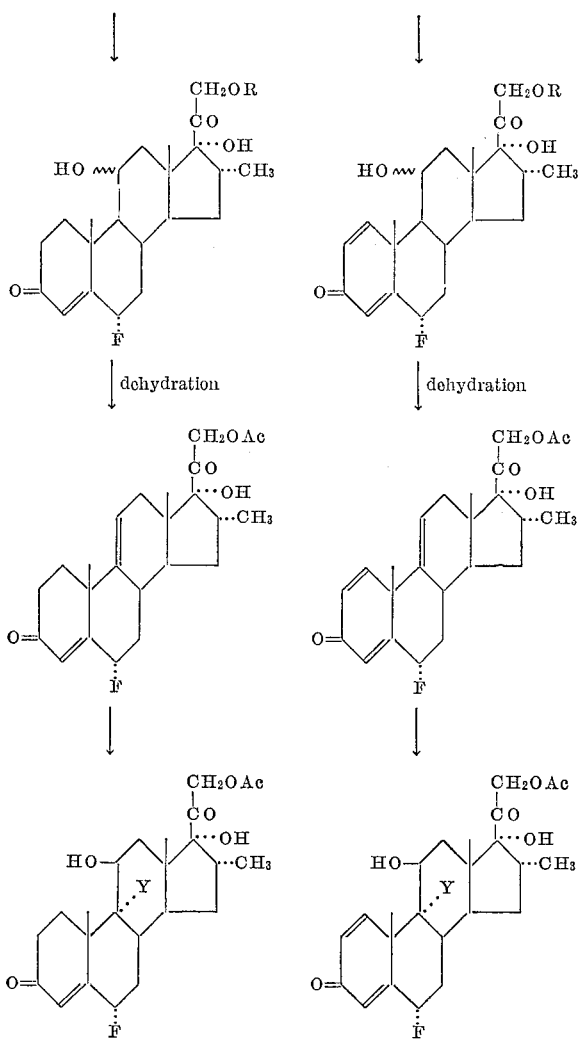

In the above equation R, Y and Ac represent the same groups as heretofore set forth.

As indicated above the starting material is 16α-methyl-6α-fluoro-Δ⁴-pregnen-17α,21-diol-3,20-dione or the hydrocarbon carboxylic acid esters thereof of less than 12 carbon atoms. It may be noted that the starting material may first be converted into the corresponding 1-dehydro compounds and that thereafter the various steps are performed upon either the Δ⁴-3-ketones or the corresponding Δ¹,⁴-3-ketones. Where this conversion is performed by refluxing the starting compound with selenium dioxide in the presence of t-butanol and catalytic amounts of pyridine preferably a lower fatty acid ester of 16α-methyl-6α-fluoro-Δ⁴-pregnen-17α,21-diol-3,20-dione is used for higher yields. Where this additional double bond is introduced by biochemical methods such as incubation with corynebacterium simplex ATCC–6946 preferably the free compound is used. The next step for either the Δ⁴-compounds or the Δ¹,⁴-compounds involves as indicated above the introduction of the 11-hydroxy group and for this step preferably the free compounds are also used. Incubation of the starting free compounds, 16α-methyl-6α-fluoro-Δ⁴-pregnen-17α,21-diol-3,20-dione or 16α-methyl-6α-fluoro-Δ¹,⁴-pregnadien-17α,21-diol-3,20-dione with adrenal gland material or with the fungus *Cunninghamella bainier* ATCC–9244 gave the corresponding 11β-hydroxy derivatives, i.e., 16α-methyl-6α-fluoro-hydrocortisone or 16α-methyl-6α-fluoro-prednisolone. By conventional esterification of these compounds there was produced the 21-monoesters thereof of hydrocarbon carboxylic acids of less than 12 carbon atoms. By conventional oxidation of these compounds with chromic acid there was also produced 16α-methyl-6α-fluoro-cortisone and 16α-methyl-6α-fluoro-prednisone as well as the 21-mono esters thereof of hydrocarbon carboxylic acids of less than 12 carbon atoms.

The biochemical oxygenation of 16α-methyl-6α-fluoro-Δ⁴-pregnen-17α,21-diol-3,20-dione or its 1-dehydroderivative with *Rhizopus nigricans* ATCC 6227b gave 16α-methyl-6α-fluoro-epi-hydrocortisone and 16α-methyl-6α-fluoro-epi-cortisone i.e. the 11α-hydroxy derivatives of the starting compounds. For the next step indicated in the equation either the 11β- or 11α-hydroxy compounds were conventionally esterified at C–21 preferably to form the lower fatty acid esters such as the acetate indicated, and the acetates were heated with methanesulfonyl chloride in admixture with pyridine and dimethylformamide to form 16α - methyl - 6α - fluoro-Δ⁴,⁹⁽¹¹⁾-pregnadien-17α,21-diol-3,20-dione 21-acetate or 16α-methyl-6α-fluoro-Δ¹,⁴,⁹⁽¹¹⁾-pregnatrien-17α,21-diol-3,20-dione 21-acetate.

To these compounds there was then applied the method which Fried et al. (J.A.C.S. 79, 1130 (1957)) described for the introduction of halogen at C–9 of the cortical hormones. Thus by reaction with hypobromous acid there was obtained 16α-methyl-6α-fluoro-9α-bromohydrocortisone acetate and 16α-methyl-6α-fluoro-9α-bromoprednisolone acetate, these bromohydrins were converted into 16α-methyl-6α-fluoro-9α,11β-oxido-Δ⁴pregnen (and Δ¹,⁴-pregnadien)-17α,21-diol-3,20-dione 21-acetate by reaction with potassium acetate in ethanol and the epoxide rings were opened with hydrogen chloride or hydrogen fluoride to form the 21-acetates of 16-methyl-6α-fluoro-9α-chlorohydrocortisone, 16 - methyl-6α-fluoro-9α-chloro-prednisolone, 16 - methyl - 6α,9α - difluoro - hydrocortisone and 16 - methyl - 6α,9α - difluoro - prednisolone respectively. Here again conventional oxidation with chromic acid for example produced the corresponding 11-keto-21-acetates and conventional hydrolysis as for example with dilute methanolic potassium hydroxide or sodium methoxide produced the corresponding free alcohols which upon conventional esterification gave other esters of hydrocarbon carboxylic acids of less than 12 carbon atoms. Obviously the above described method may be conventionally modified. Thus the hydrocortisone or cortisone derivatives may be dehydrogenated as a final step instead of initially to form prednisolone or prednisone derivatives. Further, the dehydration between C–9 and C–11 is also effected by reaction with p-toluenesulfonic acid in benezene; for the reaction with hypobromous acid there may be employed N-bromoacetamide together with perchloric acid, although there can be used any other reagent capable of liberating hypobromous acid, such as any other N-bromo-amide or -imide or the hypobromite of an alkali or alkali-earth metal; the reaction with the hydrogen halide can be carried out in any solvent inert to this reaction such as methylene chloride or carbon tetrachloride.

The following specific examples serve to illustrate but are not intended to limit the present invention.

EXAMPLE I

A mixture of 5 g. of 16α-methyl-cortisone, 150 cc. of anhydrous benzene, 60 cc. of ethyleneglycol distilled over sodium hydroxide and 800 g. of p-toluenesulfonic monohydrate acid was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 16α-methyl-3,20-bis-ethylenedioxy-Δ⁵-pregnen-17α,21-diol-11-one.

4 g. of the above compound was dissolved in 80 cc. of chloroform, cooled to 0° C., mixed with an ether solution of monoperphthalic acid containing 1.2 molar equivalents of the reagent and kept in the dark at a temperature between 0 and 5° C. for 16 hours. The mixture was diluted with water and the organic layer was separated and washed with sodium bicarbonate solution and water to neutral, dried over anhydrous sodium sulfate and evaporated. Crystallization of the residue from acetone-hexane yielded 16α-methyl-3,20-bis-ethylenedioxy-5α,6α-oxido-pregnan-17α,21-diol-11-one.

To a solution of 3 g. of the above compound in 300 cc. of a mixture of equal parts of ether and benzene there was added 3 cc. of boron trifluoride etherate and the mixture was kept at room temperature for 3 hours and then diluted with water. The organic layer was separated washed with water, dried over anhydrous sodium sulfate and evaporated to dryness. The residue was chromatographed on neutral alumina, thus giving 16α-methyl-6β-fluoro - 3,20 - bis-ethylenedioxy-pregnan-5α,17α,21-triol-11-one.

A mixture of 2 g. of the above compound, 15 cc. of pyridine and 6 cc. of acetic anhydride was kept overnight at room temperature, poured into ice water, heated on the steam bath for half an hour and cooled. The precipitate was filtered, washed with water, dried and recrystallized from acetone-hexane. There was thus obtained 16α-methyl - 6β - fluoro-3,20-bis-ethylenedioxy-pregnan-5α,17α,21-triol-11-one 21-acetate.

A slow stream of dry hydrogen chloride was introduced for 4 hours into a solution of 1.5 g. of the above compound in 100 cc. of acetic acid, maintaining the temperature below 15° C. After pouring into ice water the precipitate was filtered and dried. Recrystallization from acetone-hexane afforded 16α-methyl-6α-fluoro-cortisone 21-acetate.

A mixture of 0.5 g. of the above compound, 25 cc. of t-butanol, 0.2 g. of selenium dioxide and 0.1 cc. of pyridine was refluxed under an atmosphere of nitrogen for 48 hours, filtered through celite and the filter was washed with a little hot t-butanol. The combined filtrate and washings was evaporated to dryness under reduced pressure. The residue was refluxed for 1 hour with decolorizing charcoal in acetone, filtered from the charcoal and the filtrate was evaporated to dryness. Chromatography of the residue on washed alumina yielded 16α-methyl-6α-fluoro-prednisone 21-acetate.

A suspension of 1 g. of 16α-methyl-6α-fluoro-predisone 21-acetate in 10 cc. of absolute methanol was treated with 10 cc. of a solution of sodium methoxide in absolute methanol (prepared by dissolving 60 mg. of sodium), with stirring, under an atmosphere of nitrogen, at 0° C. for 1 hour. After precipitating with saturated aqueous sodium chloride solution containing a few drops of acetic acid, the product was filtered, and recrystallized from acetonehexane, thus affording the free 16α-methyl-6α-fluoro-prednisone.

By the same conventional method of acetylation described previously, there was esterified the hydroxyl group at C–21 of this prednisone, using the anhydride of other hydrocarbon carboxylic acids having up to 12 carbon atoms. For example, by reaction with propionic anhydride there was obtained 16α-methyl-6α-fluoro-prednisone 21-propionate. There was also prepared in this the cyclopentylpropionate and benzoate.

EXAMPLE II

By the same method to that of the previous example, a 16α-methyl-9α-halo (fluoro, chloro, bromo)-cortisone afforded the 3,20-bis-cycloethyleneketal and then the corresponding epoxide, by reaction with boron trifluoride the latter was converted into the corresponding 16α-methyl-6β-fluoro - 9α - halo-3,20-bis-ethylenedioxy-pregnan-5α,17α,21-triol-11-one; the latter was acetylated at C–21 and then treated with dry hydrogen chloride to give the respective 16α-methyl-9α-halo-6α-fluoro-cortisone 21 - acetate, which was then dehydrogenated by the reaction with selenium dioxide to produce the corresponding 16α-methyl-6α-fluoro-9α-halo-prednisone 21-acetate.

By treatment with sodium methoxide, as described in Example I, there was hydrolyzed the 21-acetate of 16α-methyl - 6α - fluoro - 9α - halo-cortisone as well as 16α-methyl-6α-fluoro - 9α - halo (bromo, chloro or fluoro)-prednisone, and then the hydroxyl group at C–21 was re-esterified with a radical of a hydrocarbon carboxylic acid different from acetic acid. The same esters specifically mentioned in Example I were formed of the free compounds just mentioned.

EXAMPLE III

In some experiments there was used for the formation of the 3,20-bis-ketal of the starting compound intsead of ethyleneglycol, propyleneglycol to produce the corresponding cyclic 3,20-bis-alkyleneketal. Since the ketal groups are later hydrolyzed, the final result in this case was the same.

EXAMPLE IV

Using in the esterification of the hydroxyl group at C–21 of 16α - methyl-6β-fluoro-3,20-bis-alkylenedioxy-pregnan-5α,17α,21-triol-11-one or of its 9α-halo-analog an anhydride different from acetic anhydride, there were obtained the corresponding 21-esters of such bis-ketal and then of 6α-fluoro-16α-methyl-cortisone, its 9α-halo-analogs and of the 1-dehydro derivatives of these Δ⁴-compounds, in the form of their respective 21-esters. Typical esters thus formed were the propionate, cyclopentylpropionate and benzoate.

EXAMPLE V 5 g. of 16α-methyl-6β-fluoro-9α-chloro-3,20-bis-ethylenedioxy-pregnan-5α,17α,21-triol-11 - one (Example II) was dissolved in 150 cc. of anhydrous tetrahydrofurane and under mechanical stirring it was slowly added, with occasional cooling, to a suspension of 1.5 g. of lithium aluminum hydride in 100 cc. of anhydrous tetrahydrofurane. The mixture was then refluxed for 4 hours and the excess of hydride was decomposed by the addition of a few drops of acetone; 15 cc. of a saturated aqueous solution of sodium sulfate were added, followed by the addition of anhydrous sodium sulfate, the solid precipitate was filtered and the solution was evaporated to dryness. Recrystallization of the residue from acetone-hexane furnished 16α - methyl-6β-fluoro-9α-chloro-3,20-bis-ethylenedioxy-pregnan-5α,11β,17α,21-tetrol.

The product was then subjected to the series of reactions described in the previous examples, to produce the 21-ester of 16α - methyl-6α-fluoro-9α-chloro-hydrocortisone and of 16α-methyl-6α-fluoro-9α-chloro-prednisolone as well as, by hydrolysis of the esterified groups of such compounds, the free alcohols which upon re-esterification gave the other 21-esters previously mentioned in Example I.

EXAMPLE VI 4 g. of 16α-methyl-6α-fluoro-cortisone was allowed to react with a mixture of 90 cc. of methanol, 2 g. of semicarbazide hydrochloride and 1.5 g. of anhydrous sodium acetate, at room temperature for 72 hours. Ice cold saturated sodium chloride solution was added and the reaction product was extracted with ethyl acetate. The extract was washed with aqueous sodium bicarbonate solution and water, dried over anhydrous sodium sulfate, mixed with a few drops of pyridine and evaporated to dryness under reduced pressure. The residue consisted of the 3,20-bis-semicarbazone of 16α-methyl-6α-fluoro-cortisone.

3.5 g. of the above bis-semicarbazone in 80 cc. of tetrahydrofurane was treated with a solution of 1.75 g. of sodium borohydride in 40 cc. of water and the mixture was kept overnight at room temperature; an additional gram of hydride was added in 5 cc. of water and the mixture was refluxed for 1 hour and cooled; the excess of hydride was destroyed by the addition of acetic acid, a few drops of pyridine were added and the tetrahydrofurane was removed by distillation. Water was added to the cooled mixture and the product was extracted with ethyl acetate, washed with water, dried over anhydrous sodium sulfate and evaporated to dryness under reduced pressure. Recrystallization of the residue from aqueous methanol containing a few drops of pyridine yielded the 3,20-bis-semicarbazone of 16α-methyl-6α-fluoro-hydrocortisone.

2 g. of the 3,20-bis-semicarbazone of 16α-methyl-6α-fluoro-hydrocortisone was suspended in a hot mixture of 10 cc. of acetic acid and 2.5 cc. of water, then treated with 1.75 cc. of 50% pyruvic acid and the mixture was refluxed. The bis-semicarbazone dissolved after a short time and the refluxing was continued for 20 minutes further. Under continuous heating there was then added 20 cc. of water in the course of 10 minutes and the mixture was slowly cooled and finally kept in the refrigerator for 2 hours. The precipitate was filtered, washed with water, dried, dissolved in 10 cc. of pyridine, treated with 2 cc. of acetic anhydride and kept overnight at room temperature, in order to complete the acetylation at C–21 which occurred during the hydrolysis of the semicarbazone. The product was worked up by diluting with water, extraction with ethyl acetate and recrystallization from acetone-hexane of the residue obtained after the extract was washed and dried. There was thus obtained 16α-methyl-6α-fluoro-hydrocortisone 21-acetate.

Upon subsequent dehydrogenation, in accordance with Example II, there was obtained 16α-methyl-6α-fluoro-prednisolone 21-acetate.

Treatment with sodium methoxide in accordance with the method described in Example I, afforded the free 16α-methyl-6α-fluoro-hydrocortisone and 16α-methyl-6α-fluoro-prednisolone. Esterification of the last compound with propionic anhydride produced after isolation and purification 16α - methyl-6α-fluoro-prednisolone-21-propionate.

EXAMPLE VII

A solution of 10 g. of 16α-methyl-Δ⁵-pregnen-3β-ol-11,20-dione in 200 cc. of chloroform was treated with an ether solution of permonophthalic acid containing 1.2 molar equivalents of reagent, the mixture was kept for 20 hours at room temperature and in the dark and then diluted with water; the organic layer was separated, washed with water, sodium bicarbonate solution and again with water until neutral, dried over anhydrous sodium sulfate and evaporated to dryness under reduced pressure. Chromatography of the residue on neutral alumina yielded 16α-methyl-5α,6α-oxido-pregnan-3β-ol-11,20-dione.

A solution of 8 g. of the above compound in 800 cc. of a mixture of equal parts of ether and benzene was treated with 8 cc. of boron trifluoride etherate and the mixture was allowed to react at room temperature for 3 hours. The solution was then washed with water, dried over anhydrous sodium sulfate and the solvent was evaporated. The residue was chromatographed on neutral alumina, thus furnishing 16α-methyl-6β-fluoro-pregnan-3β,5α-diol-11,20-dione.

A mixture of 6 g. of the above compound, 2.7 g. of p-toluenesulfonic acid and 300 cc. of acetic anhydride was subjected to a slow distillation so 240 cc. of distillate was collected in the course of 5 hours. The cooled residue was poured into ice water, the product was extracted with ether and the extract was washed with 5% aqueous sodium carbonate solution and water, dried over anhydrous sodium sulfate and evaporated to dryness. The residue consisted of 16α-methyl-6β-fluoro-Δ¹⁷⁽²⁰⁾-pregnen-3β,5α,20-triol-11-one triacetate which was used for the next step without further purification. A pure sample of this compound was obtained by chromatography on neutral alumina.

Alternatively, the above enol acetate was also produced by reaction with isopropenyl acetate, under the usual conditions for this reaction.

A mixture of 6 g. of the crude 16α-methyl-6β-fluoro-Δ¹⁷⁽²⁰⁾-pregnen-3β,5α,20-triol-11-one and 240 cc. of a benzene solution of perbenzoic acid containing 1.2 molar equivalents of the peracid was kept for 20 hours at room temperature in the dark (in another experiment chloroform was used instead of benzene). The mixture was diluted with water and the organic layer was washed with aqueous sodium bicarbonate solution and water, dried over anhydrous sodium sulfate and evaporated to dryness. The residue consisted of the crude 16α-methyl-6β-fluoro-17α,20-oxido-pregnan-3β,5α,20 - triol - 11 - one triacetate. A pure sample of the compound was obtained by crystallization from acetone-hexane.

The above crude oxido compound was treated with 500 cc. of a 1% solution of potassium hydroxide in methanol for 1 hour at room temperature; the mixture was neutralized with acetic acid, concentrated to a small volume under reduced pressure, diluted with water and the precipitate formed was collected by filtration, washed with water, dried and recrystallized from acetone-hexane. There was thus obtained 16α-methyl-6β-fluoro-pregnan-3β,5α,17α-triol-11,20-dione 5-acetate.

A solution of 3 g. of the above compound in 150 cc. of dioxane was treated with a solution of 1.2 g. of bromine in 70 cc. of dioxane (in another experiment the dioxane was substituted for chloroform). The bromine solution was added dropwise, with stirring and maintaining the temperature at around 15° C. The mixture was kept at room temperature for half an hour and then poured into 5% aqueous sodium bicarbonate solution; the product was extracted with several portions of chloroform and the extract was washed with water, dried over anhydrous sodium sulfate and evaporated to dryness under reduced pressure at a temperature below 45° C. There was thus obtained 16α-methyl-6β-fluoro-21-bromo-pregnan-3β,5α,17α-triol-11,20-dione-5-acetate, which was used for the next step without further purification. A pure sample of this compound was obtained by recrystallization from chloroform-methanol at low temperature.

The above crude 16α-methyl - 6β - fluoro - 21 - bromo-pregnan-3β,5α,17α-triol-11,20-dione 5-acetate was mixed with 1.8 g. of sodium iodide, 1.5 g. of glacial acetic acid and 120 cc. of acetone and the mixture was refluxed for 10 hours and then poured into water. The product was extracted several times with chloroform and the extract was washed with water, dried over anhydrous sodium sulfate and the chloroform was evaporated. Recrystallization of the residue from acetone-hexane afforded 16α-methyl-6β-fluoro-pregnan - 3β,5α,17α,21 - tetrol - 11,20-dione 5,21-diacetate.

A stirred solution of 2 g. of the above compound in 100 cc. of 90% acetic acid was treated little by little with a solution of 400 mg. of chromium trioxide in 10 cc. of water and 10 cc. of glacial acetic acid, maintaining the temperature below 15° C. After diluting with water, the precipitate was filtered, washed with water, dried and recrystallized from acetone-hexane. There was thus obtained 16α-methyl-6β-fluoro-pregnan-5α,17α,21-triol-3,11,20-trione 5,21-diacetate.

A solution of 1.5 g. of the above compound in 100 cc. of glacial acetic acid was treated with 1.5 cc. of aqueous concentrated hydrochloric acid and the mixture was kept for 1 hour at room temperature. The product was precipitated by dilution with water and then filtered, washed with water, dried and recrystallized from acetone-hexane. There was thus obtained 16α-methyl-6β-fluoro-cortisone 21-acetate.

1 g. of 16α-methyl-6β-fluoro-cortisone 21-acetate was dissolved in 100 cc. of glacial acetic acid and a slow stream of dry hydrogen chloride was introduced for 8 hours into the solution, maintaining the temperature below 18° C. The mixture was poured into ice water and the precipitate was collected, washed with water, dried and recrystallized from acetone-hexane, thus yielding 16α-methyl-6α-fluoro-cortisone 21-acetate.

In another experiment the reaction with aqueous concentrated hydrochloric acid was omitted and 16α-methyl- 6β-fluoro-pregnan-5α,17α,21-triol-3,11,20-trione 5,21 - diacetate was directly treated with dry hydrogen chloride in mixture with glacial acetic acid as described above, to produce 16α-methyl-6α-fluoro-cortisone 21-acetate.

EXAMPLE VIII

A suspension of 1.8 g. of 16α-methyl-6β-fluoro-pregnan-3β,5α,17α,21 - tetrol - 11,20 - dione 5,21 - diacetate, intermediate in the method of the previous example, in 60 cc. of acetone was treated with an 8 N solution of chromic acid obtained by dissolving 26.7 g. of chromium trioxide in 23 cc. of concentrated sulfuric acid and diluting to 100 cc. with water; the addition of the 8 N chromic acid was effected dropwise in the course of 10 minutes, with continuous stirring under an atmosphere of nitrogen and maintaining the temperature at around 10° C., until the mixture showed a persistent brown-orange color. It was then stirred for 5 minutes more, diluted with water and the precipitate formed was collected, washed with water and recrystallized from methanol-water. There was thus obtained 16α-methyl-6β-fluoro-pregnan-5α,17α,21-triol- 3,11,20-trione 5,21-diacetate, identical with the intermediate described in Example VII.

EXAMPLE IX 5 g. of 16α-methyl-6β-fluoro-pregnan-3β,5α,17α-triol-11,20-dione 5-acetate, intermediate in the method of Example VII, was treated with chromic acid in accordance with the method of Example VII, to produce 16α-methyl-6β-fluoro-pregnan-5α,17α-diol-3,11,20-trione 5-acetate.

By following exactly the method described in Example VII, 3 g. of the above compound was treated with aqueous concentrated hydrochloric acid in mixture with acetic acid, to give 16α-methyl-6β-fluoro-Δ⁴-pregnen-17α-ol-3,11,20-trione, namely 16α-methyl-6β-fluoro-21-desoxy-cortisone; the steric configuration at C–6 was inverted by treatment with dry hydrogen chloride in glacial acetic acid solution, to produce 16α-methyl-6α-fluoro-21-desoxy-cortisone.

A cooled solution of 2 g. of 16α-methyl-6α-fluoro-21-desoxy-cortisone in 15 cc. of tetrahydrofurane and 9 cc. of methanol was treated under continuous stirring with 3 g. of calcium oxide and then with 3 g. of iodine. The stirring was continued at room temperature until the solution turned pale yellow and then the mixture was poured into ice water containing 9 cc. of acetic acid and 1 g. of sodium thiosulfate, stirred for 15 minutes and most of the liquid was separated by decantation. The precipitate was filtered, washed with water and dried under vacuum. There was thus obtained 16α-methyl-6α-fluoro-21-iodo-Δ⁴-pregnen-17α-ol-3,11,20-trione in crude form. The latter was mixed with 50 cc. of acetone and 6 g. of recently fused potassium acetate and refluxed for 8 hours. The mixture was concentrated to a small volume under reduced pressure, cooled, diluted with water and the product was extracted with ether. The extract was washed with water, dried over anhydrous sodium sulfate and the ether was evaporated. Crystallization of the residue from acetone-hexane yielded 16α-methyl-6α-fluoro-cortisone 21-acetate.

EXAMPLE X

A mixture of 5 g. of 16α-methyl-6β-fluoro-17α,20-oxido-pregnan-3β,5α,20-triol-11-one triacetate, intermediate in the method of Example VII, and 500 cc. of a 1% solution of potassium hydroxide in methanol was refluxed for 4 hours, neutralized with acetic acid and concentrated to a small volume under reduced pressure, the residue was diluted with water and the precipitate was collected, washed with water, dried and recrystallized from acetone-hexane. There was thus obtained the free 16α-methyl-6β-fluoro-pregnan-3β,5α,17α-triol-11,20-dione.

This compound was then subjected to the reactions described in the previous examples, exactly following the procedures therein described. By monobromination at C–21 there was obtained 16α-methyl-6β-fluoro-21-bromo-pregnan-3β,5α,17α-triol-11,20-dione; the subsequent treatment with sodium iodide and potassium acetate furnished (via 16α-methyl-6β-fluoro-21-iodo-pregnan - 3β,5α,17α-triol-11,20-dione which was not isolated) 16α-methyl-6β-fluoro - pregnan - 3β,5α,17α,21 - tetrol-11,20 - dione 21-acetate; the step of oxidation then produced 16α-methyl-6β - fluoro - pregnan - 5α,17α,21-triol-3,11,20-trione 21-acetate; upon subsequent reaction with aqueous concentrated hydrochloric acid there was obtained 16α-methyl-6β-fluoro - cortisone 21-acetate, identical with the one described in Example VII.

EXAMPLE XI

The oxidation of 16α-methyl-6β - fluoro - pregnan-3β,5α,17α-triol - 11,20-dione of the previous example, in accordance with the procedure of Example VII, afforded 16α - methyl - 6β-fluoro - pregnan-5α,17α-diol-3,11,20-trione; the latter was then converted into 16α-methyl-6β-fluoro-21-deoxycortisone or into 16α - methyl - 6β-fluoro-21-desoxycortisone, respectively, which were identical with the intermediates of Example IX; the reaction with hydrogen chloride was conducted under the conditions therein described.

EXAMPLE XII

A mixture of 3 g. of 16α-methyl-6β-fluoro-21-bromo-pregnan-3β,5α,17α-triol - 11,20 - dione 5-acetate, intermediate of Example VII, 7 g. of sodium iodide and 50 cc. of acetone was kept standing at room temperature for 24 hours (there can also be used another solvent, such as ethanol). Then it was diluted with water and the product was extracted with ether, washed with sodium thiosulfate solution until decoloration and then with water, dried over anhydrous sodium sulfate and the ether was evaporated, thus giving 16α-methyl-6β-fluoro - 21 - iodo-pregnan-3β,5α,17α - triol-11,20-dione 5-acetate in crude form. In another experiment the compound was obtained in pure form by recrystallization from chloroform, at low temperature.

The crude iodo compound was then treated with potassium acetate in mixture with acetone, following the method of Example IX, to form 16α-methyl-6β-fluoro-3β,5α,17α,21-tetrol-11,20-dione 5,21-diacetate, identical to the intermediate described in Example VII; in another experiment, the free 16α-methyl-6β-fluoro-21-bromo-pregnan-3β,5α,17α-triol-11,20-dione was converted by the same method into the intermediate 16α-methyl-6β-fluoro-21-iodo-pregnan-3β,5α,17α-triol-11,20-dione, which was in turn converted into 16α-methyl - 6β-fluoro-pregnan-3β,5α17α,21-tetrol-11,20-dione 21-acetate, identical with the compound described in Example X.

EXAMPLE XIII 2 g. of 16α-methyl-6β-fluoro-21-desoxycortisone, intermediate in the method of Example IX, was iodinated at C–21 by the reaction with calcium oxide and iodine, in accordance with the method described in Example IX, thus producing 16α-methyl-6β-fluoro-21-iodo-Δ⁴-pregnen-17α-ol-3,11,20-trione; the latter was refluxed with potassium acetate in mixture with acetone, as described in Example IX, to furnish 16α-methyl-6β-fluoro-cortisone 21-acetate.

EXAMPLE XIV

By means of the reaction already described in the literature of Δ⁵,¹⁶-pregnadien-3β-ol-20-one with methyl magnesium bromide, preferably followed by chromatography and/or purification by means of Girard T reagent, there was obtained 16α-methyl-Δ⁵-pregnen-3β-ol-20 - one (M.P. 183–185° C.), which was acetylated to its 3-acetate by reaction with acetic anhydride in pyridine solution.

A solution of 5 g. of 16α-methyl-Δ⁵-pregnen-3β-ol-20-one acetate (M.P. 177° C.) in 100 cc. of chloroform was treated with an ether solution of permonophthalic acid containing 1.5 molar equivalents of the reagent; the mixture was allowed to react at room temperature for 16 hours, although other experiments showed that the epoxidation is almost complete after a shorter period (5–6 hours). The mixture was diluted with water and the organic layer was washed with water, then with 5% aqueous sodium bicarbonate solution and finally again with water, dried over sodium sulfate and evaporated to dryness. The residue was chromatographed on a column of neutral alumina, first eluting 16α-methyl-5β,6β-oxido-pregnan-3β-ol-20-one acetate and then 16α-methyl-5α,6α-oxido-pregnan-3β-ol-20-one acetate, which was purified by recrystallization from acetone-hexane (M.P. 161–163° C.). In other experiments the crude epoxidation product was purified by crystallization, without chromatography, thus affording 16α-methyl-5α,6α-oxido-pregnan-3β-ol-20-one acetate with M.P. 158–160° C., also sufficiently pure to be used for the transformation of the next step.

A solution of 3 g. of 16α-methyl-5α,6α-oxido-pregnan-3β-ol-20-one acetate (M.P. 161–163° C.) in 300 cc. of a mixture of equal parts of ether and benzene was mixed with 3 cc. of boron trifluoride etherate and the mixture was allowed to react at room temperature for 24 hours. The solution was then washed with 5% sodium bicarbonate solution and water, dried over anhydrous sodium sulfate, evaporated to dryness and the residue was purified by chromatography on neutral alumina. There was thus obtained 16α-methyl-6β-fluoro-pregnan-3β,5α - diol-20-one 3-acetate; M.P. 261–263° C.

A mixture of 8 g. of the above compound, 3.6 g. of p-toluenesulfonic acid and 400 cc. of acetic anhydride was subjected to a slow distillation for 48 hours, collecting 320 cc. of distillate. The residue was cooled, poured into ice water and the product was extracted with ether, washed with 5% aqueous sodium carbonate solution and water, dried over anhydrous sodium sulfate and the ether was evaporated. The oily residue consisted of 16α-methyl-6β-fluoro-$\Delta^{17(20)}$-pregnen-3β,5α,20-triol triacetate, which was used for the next step without further purification.

A mixture of 4 g. of the above crude compound and 160 cc. of a benzene solution of perbenzoic acid containing 1.2 equivalents of the reagent was kept at room temperature for 72 hours and diluted with water; the organic layer was separated, washed with aqueous sodium bicarbonate solution and water, dried over anhydrous sodium sulfate and evaporated to dryness. The residue consisted of 16α-methyl - 6β - fluoro-17,20-oxido-pregnan-3β,5α,20-triol triacetate. A sample was purified by recrystallization from acetone-hexane.

The above crude compound was treated with 2 lt. of a 0.5 N solution of sodium hydroxide in 50% aqueous methanol, kept at room temperature for 1 hour, acidified with acetic and concentrated to a small volume under reduced pressure; after diluting with ice water the precipitate formed was collected, washed with a little cold water, dried and recrystallized from methanol-acetone. There was thus obtained 16α-methyl - 6β - fluoro-pregnan-3β,5α,17α-triol-20-one 5-acetate, melting point 214–216° C., [α]$_D$ −35°.

A solution of 3 g. of the latter substance in 150 cc. of dioxane was treated dropwise, with stirring at room temperature, with a solution of 1.2 g. of bromine in 70 cc. of dioxane. After 5 minutes the solution was poured into 10% aqueous sodium bicarbonate solution, the product was extracted several times with chloroform and the extract was washed with water, dried over anhydrous sodium sulfate and evaporated to dryness under reduced pressure in a bath at a temperature below 50° C. By recrystallization of a sample of the residue there was obtained 16α-methyl - 6β - fluoro-21-bromo-pregnan-3β,5α,17α-triol-20-one-5-acetate in pure form.

A mixture of 3 g. of the above crude 16α - methyl-6β-fluoro - 21 - bromo - pregnan-3β,5α,17α-triol-20-one-5-acetate, 120 cc. of anhydrous acetone, 3.9 g. of anhydrous potassium acetate and 1.5 cc. of glacial acetic acid was refluxed for 9 hours. The suspension was then poured into water, extracted several times with chloroform and the extract was washed with water, dried over anhydrous sodium sulfate and evaporated to dryness. Crystallization of the residue from acetone - hexane yielded 16α-methyl - 6β - fluoro - pregnan-3β,5α,17α,21-tetrol-20-one 5,21-diacetate melting point 198–200° C., [α]$_D$ +6°.

A suspension of 900 mg. of the above compound in 30 cc. of acetone recently distilled over potassium permanganate was treated dropwise under stirring with 22 cc. of an 8 N solution of chromic acid obtained by dissolving 26.7 g. of chromium trioxide in 23 cc. of concentrated sulfuric acid and diluting to 100 cc. The addition was carried out at a temperature between 10 and 15° C. and under an atmosphere of nitrogen. The mixture was stirred for 5 minutes further and then diluted with water. The precipitate was collected by filtration, washed with water and recrystallized from methanol-water, thus yielding 16α-methyl - 6β - fluoro-pregnan-5α, 17α-21-triol - 3,20 - dione 5,21-diacetate, melting point 228–230° C., [α]$_D$ +5°.

A slow stream of dry hydrogen chloride was introduced for 2 hours into a solution of the above compound in 50 cc. of glacial acetic acid, maintaining the temperature below 15° C. After pouring into ice water, the precipitate formed was collected, washed with water, dried and recrystallized from acetone-hexane. There was thus obtained 16α-methyl - 6α - fluoro-$\Delta^4$-pregnan - 17α,21-diol - 3,20 - dione-acetate melting point 196–198° C., [α]$_D$ +16°.

EXAMPLE XV

A mixture of 3 g. of 16α-methyl - 6β - fluoro-21-bromo-pregnan-3β,5α,17α - triol - 20 - one 5-acetate, 7 g. of sodium iodide and 50 cc. of acetone (ethanol can also be used) was allowed to react at room temperature for 24 hours, diluted with water and extracted with ether; the extract was washed with aqueous sodium thiosulfate solution and the solvent as removed under reduced pressure in a bath below 35° C., thus leaving as a residue 16α-methyl - 6β - fluoro - 21 - iodo-pregnan-3β,5α,17α-triol-20-one 5 acetate in crude form.

The above crude compound was mixed with 60 cc. of acetone and 8 g. of recently fused potassium acetate and the mixture was refluxed for 8 hours, concentrated to a small volume and diluted with ether; the product was extracted with ether, washed with water, dried over anhydrous sodium sulfate and concentrated until crystallization started. After cooling, the crystals ere collected by filtration and recrystallized from methanol-water, thus furnishing 16α - methyl - 6β - fluoro-pregnan-3β,5α,17α 21-tetrol - 20 - one 5,21-diacetate, identical with the intermediate of the previous example.

EXAMPLE XVI

To a cooled solution of 2 g. of 16α-methyl - 6β - fluoro-pregnan-3β,5α,17α - triol-20-one-5-acetate in 15 cc. of tetrahydrofurane and 9 cc. of methanol there was added under continuous stirring and in small portion 3 g. of pure calcium oxide followed by 3 g. of iodine. The stirring was continued at room temperature until the solution turned pale yellow and then it was poured into ice water containing 1 g. of sodium thiosulfate and stirred for 15 minutes more. The solution was decanted and the precipitate was collected, thus giving 16α-methyl - 6β - fluoro-21-iodo - pregnan-3β,5α,17α-triol-20-one 5-acetate, identical with the intermediate of the previous example.

EXAMPLE XVII

In accordance with method described in Example XIV for the oxidation of 16α-methyl - 6β - fluoro - pregnan-3β,5α,17α,21-tetrol-20-one 5, 21 - diacetate, there was treated 5 g. of 16α-methyl - 6β - fluoro - pregnan-3β,5α, 17α-triol - 20 - one 5-acetate (intermediate in Example XIV) with 8 N chromic acid. There was thus obtained 16α-methyl - 6β - fluoro - pregnan-5α,17α-diol-3,20-dione 5-acetate.

A solution of 3 g. of the above compound in glacial acetic acid was treated with dry hydrogen chloride for 4 hours at a temperature around 15° C. and then poured into ice water. The precipitate was collected, washed with water, dried and recrystallized from acetone-hexane, thus affording 16α - methyl - 6α - fluoro-17α-hydroxy-progesterone.

2 g. of the above compound in mixture with tetrahydrofurane and methanol was treated with iodine and calcium oxide, exactly as described for this reaction in Example XVI for the 21-iodination of 16α - methyl-6β-fluoro-pregnan-3β,5α,17α - triol - 20 - one 5-acetate. There was thus obtained 16α-methyl - 6β - fluoro - 21-iodo-17α-hydroxy-progesterone.

Upon subsequent acetolysis, by reaction with potassium acetate in mixture with acetone (see Example XV), there was obtained 16α-methyl-6α-fluoro-$\Delta^4$-pregnen-17α, 21-diol-3,20-dione 21-acetate, identical with the final compound of Example XIV.

EXAMPLE XVIII

A mixture of 10 g. of 16α-methyl-6α-fluoro-$\Delta^4$-pregnen-17α, 21-diol-3, 20-dione 21-acetate and 300 cc. of 0.3% methanolic potassium hydroxide solution was stirred for 1 hour at 0° C. under an atmosphere of nitrogen; it was then acidified with acetic acid, concentrated to a small volume and precipitated with water, thus giving the free 16α-methyl-6α-fluoro-$\Delta^4$-pregnen-17α,21-diol-3,20-dione in crude form, which was collected by filtration, washed with water, dried and recrystallized from acetone-hexane. By conventional esterification (acid anhydride pyridine) there was prepared the 21-propionate, 21-cyclopentylpropionate and 21-benzoate of this compound.

EXAMPLE XIX

For the incubation with bovine suprarenal glands there was prepared an aqueous medium as follows: there were mixed 425 cc. of a 1.74% dipotassium hydrogen phosphate solution and 75 cc. of a 1.38% solution of sodium-dihydrogen phosphate ("A"); a mixture of 1 l. of 4.5% sodium chloride solution, 40 cc. of 5.75% potassium chloride solution and 19.1% magnesium sulfate solution was diluted to 5 l. ("B"); a solution of 20.9 g. of fumaric acid and 14.4 g. of sodium hydroxide in 1 l. of water was diluted to 1.2 l. ("C"); then there were mixed 475 cc. of "A," 4.32 l. of "B" and 1.2 l. of "C."

The fat was removed from the suprarenal glands obtained from recently slaughtered bovine, and the glands were then ground in a meat grinder; 3 kg. of the resulting homogeneous mass was added to 6 l. of the above aqueous medium.

There was then added a solution of 3 g, of 16α-methyl-6α - fluoro-$\Delta^4$-pregnen-17α,21 - diol-3,20 - dione in the minimum amount of propylene glycol and the mixture was stirred for 3 hours at 28–37° C.; 40 l. of acetone was then added and the stirring was continued for 1 hour more at room temperature.

The solid was removed by filtration and washed with two portions of 10 l. of acetone; the combined filtrate and washings was evaporated to 5 l. under reduced pressure and at a temperature below 30° C. The residue was washed with 3 portions of 4 l. of hexane each and the hexane was discarded. The reaction product was then extracted with several portions of methylene chloride and the extract was washed with water, dried over anhydrous sodium sulfate and concentrated to 300 cc. under reduced pressure and taking care that the temperature did not rise over room temperature. The concentrated solution was transferred to a column charged with a mixture of 90 g. of silica gel and 90 g. of celite and the column was washed with a mixture of 3 l. of methylene chloride and 100 of acetone and finally with a mixture of 1600 cc. of methylene chloride and 400 cc. of acetone, thus eluting with the latter solvents the 16α-methyl-6α-fluoro-hydrocortisone, which was purified by crystallization from acetone-hexane.

EXAMPLE XX

A culture of *Cunninghamella bainieri* ATCC 9244 was prepared by inoculating an aqueous medium containing 2% of peptone and 5% of corn syrup with a vegetating growing culture of such fungus in the same medium and then stirring at 28° C. for 24 hours.

To each liter of this culture there was added 30 cc. of a 1% solution of 16α-methyl-6α-fluoro-$\Delta^4$-pregnen-17α, 21-diol-3,20-dione in methanol and the mixture was stirred under aeration for 24 hours at 28° C. A total of 3 g. of the steroid was incubated in this manner. The product was then extracted with methylene chloride and the extract was washed with water, dried over anhydrous sodium sulfate and concentrated to a small volume under reduced pressure.

The combined concentrated extracts were absorbed in a column charged with a mixture of 60 g. of silica gel and 60 g. of celite previously washed with methylene chloride. The product was then eluted with a mixture of methylene chloride and acetone (80:20), the solvent was evaporated and the residue was crystallized from acetone-hexane; there was thus obtained 16α-methyl-6α-fluoro-hydrocortisone, identical with the one obtained in accordance with the method of the previous example.

EXAMPLE XXI

By following the procedure described in the previous example, but substituting for the culture of *Cunninghamella bainieri* a culture of *Rhizopus nigricans* ATCC 6227b, there was obtained 16α-methyl-6α-fluoro-epihydrocortisone.

EXAMPLE XXII

A mixture of 10 g. of 16α-methyl-6α-fluoro hydrocortisone, obtained as described in Example XIX, 40 cc. of pyridine and 10 cc. of acetic anhydride was kept overnight at room temperature and then poured into ice water. The precipitate was collected, washed with water, dried and recrystallized from acetone-hexane, thus yielding 16α-methyl-6α-fluoro-hydrocortisone 21-acetate, M.P. 245–248° C.; $[\alpha]_D$ +115° (chloroform); max. 236–8 mμ, log E 4.22.

A mixture of 10 g. of the above compound, 125 cc. of dimethylformamide and 7.5 cc. of pyridine was treated with 4.2 cc. of methanesulfonyl chloride at 80° C. for half an hour, cooled and diluted with water. The product was extracted with ethyl acetate and the extract was washed with water, dried over anhydrous sodium sulfate and evaporated to dryness. Recrystallization of the residue from acetone-hexane afforded 16α - methyl - 6α - fluoro-$\Delta^{4,9(11)}$-pregnadien-17α,21-diol-3,20-dione 21-acetate.

A stirred mixture of 7.5 g. of the above compound, 75 cc. of pure dioxane and 12 cc. of 0.4 N perchloric acid was treated in the course of 1 hour with 4.2 g. of N-bromoacetamide, at room temperature and in the dark. The mixture was stirred in the dark for one hour further, treated with 10% sodium sulfite solution until the starch-potassium iodine paper no longer turned blue and then ice and 120 cc. of chloroform were added. The organic layer was separated, washed with water, 5% sodium bicarbonate solution and water, and evaporated to dryness under reduced pressure at room temperature. Upon trituration of the residue with acetone and cooling, there was obtained 16α-methyl-6α-fluoro-9α-bromo-hydrocortisone 21-acetate.

A solution of 5 g. of the above compound in 10 cc. of dioxane was slowly treated with a mixture of 1.6 g. of anhydrous potassium acetate and 20 cc. of absolute ethanol, previously heated nearly to boiling. The mixture was refluxed for 45 minutes, cooled, diluted with 50 cc. of ice water and the precipitate formed collected, washed with water, and dried, thus producing 16α-methyl-6α- fluoro - 9β,11β - oxido - Δ⁴ - pregnen - 17α,21 - diol - 3,20-dione 21-acetate.

In a polyethylene flask fitted with a magnetic stirrer there was dissolved 5 g. of the above compound in 80 cc. of pure chloroform, cooled to 0° C. and treated in the course of 20 minutes with 6.8 g. of anhydrous hydrogen fluoride, with stirring and maintaining the temperature at 0° C. The mixture was stirred for 2 hours longer and then neutralized by the cautious addition of aqueous sodium bicarbonate solution. The mixture was transferred to a separatory funnel, the organic layer was separated, washed with water and concentrated under reduced pressure until an abundant precipitate separated, which was collected. It was redissolved in 20 cc. of hot ethyl acetate, filtered from some insoluble material, concentrated and cooled, thus yielding 16α-methyl-6α,9α-difluoro-hydrocortisone 21-acetate.

A mixture of 1 g. of the above compound, 50 cc. of t-butanol, 200 mg. of selenium dioxide and a few drops of pyridine was refluxed under an atmosphere of nitrogen for 48 hours and then filtered through celite. The solution was evaporated to dryness under reduced pressure and the residue was dissolved in acetone, treated with decolorizing charcoal and refluxed for 1 hour. After filtration, the solution was evaporated to dryness and the residue of the crude product was purified by chromatography on neutral alumina, thus producing 16α-methyl-6α,9α-difluoro-prednisolone 21-acetate.

EXAMPLE XXIII

A solution of 4 g. of 16α - methyl - 6α - fluoro-9β,11β - oxido - Δ⁴ - pregnene - 17α,21 - diol - 3,20 - dione 21-acetate, prepared in accordance with the method of the previous example, in 40 cc. of pure chloroform was cooled to 0° C. and slowly treated under stirring with a 5 N solution of dry hydrogen chloride in chloroform. The mixture was stirred for 1 hour at 0° C., diluted with water and the organic layer was washed with water, 5% sodium carbonate solution and again with water, dried over anhydrous sodium sulfate and the chloroform was removed. Recrystallization of the residue from acetone-hexane furnished 16α-methyl-6α-fluoro-9α-chloro-hydrocortisone 21-acetate.

EXAMPLE XXIV 3 g. of 16α - methyl - 6α - fluoro - epi - hydrocortisone, obtained as described in Example XXI, was selectively acetylated at C–21 by reaction with 1 molar equivalent of acetic anhydride in pyridine solution at 0° C.

Upon subsequent treatment with methanesulfonyl chloride, in accordance with the method of Example XXII, there was obtained 16α-methyl-6α-fluoro-Δ⁴,⁹⁽¹¹⁾-pregnadien-17α,21-diol-3,20-dione 21-acetate, identical with the intermediate mentioned in such example.

EXAMPLE XXV

By applying the method of dehydrogenation with selenium dioxide described in Example XXII, 10 g. of 16α-methyl - 6α - fluoro - Δ⁴ - pregnen - 17α,21 - diol - 3,20-dione 21-acetate was converted into 16α-methyl-6α-fluoro-Δ¹,⁴ - pregnadien - 17α,21 - diol - 3,20 - dione 21 - acetate. By hydrolysis with potassium hydroxide, in accordance with Example XIX, there was then obtained the free 16α-methyl - 6α - fluoro - Δ¹,⁴ - pregnadien - 17α,21 - diol-3,20-dione.

1 g. of the above compound was incubated with bovine suprarenal glands, in accordance with the procedure described in Example XIX, to produce 16α-methyl-6α-fluoro-prednisolone.

1 g. of 16α - methyl - 6α - fluoro - Δ¹,⁴ - prednadien-17α,21-diol-3,20-dione was incubated with *Cunninghamella bainieri* ATCC 9244, in accordance with Example XX, to form 16α-methyl-6α-fluoro-prednisolone.

By incubation with *Rhizopus nigricans* ATCC 6227b, in accordance with Example XXI, 1 g. of 16α-methyl-6α-fluoro - Δ¹,⁴ - pregnadien - 17α,21 - diol - 3,20 - dione was converted into 16α-methyl-6α-fluoro-epi-prednisolone.

By selective acetylation at C–21, using in the case of 16α - methyl - 6α - fluoro - epi - prednisolone only 1 molar equivalent of acetic anhydride, at low temperature and in pyridine solution, there were obtained the 21-acetates of 16α-methyl-6α-fluoro-prednisolone and of 16α-methyl-6α-fluoro-epi-prednisolone, respectively.

Upon subsequent reaction with mesyl chloride, in accordance with Example XXII, both of the above compounds were converted into the same product, namely 16α-methyl-6α-fluoro - Δ¹,⁴,⁹⁽¹¹⁾ - pregnatrien - 17α,21-diol-3,20-dione 21-acetate. By then applying the reactions described in Examples XXII and XXIII, there were obtained the 21-acetates of 16α-methyl-6α-fluoro-9α-bromo-prednisolone, of 16α - methyl - 6α - fluoro - 9β,11β-oxido - Δ¹,⁴ - pregnadien - 17α,21 - diol - 3,20 - dione, of 16α - methyl - 6α,9α - difluoro - prednisolone and of 16α-methyl-6α-fluoro-9α-chloro-prednisolone.

EXAMPLE XXVI

A mixture of 5 g. of 16α-methyl-6α-fluoro-acetate, described in Example XXII, and 100 cc. of acetic acid was treated with a solution of 1 g. of chromium trioxide in 20 cc. of 50% acetic acid, at 15° C., with stirring and for 2 hours; the mixture was then diluted with water and the precipitate was collected, washed with water, dried and recrystallized from acetone-hexane, thus yielding 16α-methyl-6α-fluoro-cortisone 21-acetate.

By dehydrogenation of 3 g. of the above compound with selenium dioxide, in accordance with the method described in Example XXII, there was obtained 16α-methyl-6α-fluoro-prednisone 21-acetate.

A solution of 2 g. of the above compound in methanol was treated with potassium hydroxide, in accordance with the method of hydrolysis described in Example XIX, to give the free 16α-methyl-9α-fluoro-prednisone.

A mixture of 1 g. of the above compound, 10 cc. of pyridine and 3 g. of cyclopentylpropionic acid anhydride was kept overnight at room temperature, poured into water, heated for 1 hour on the steam bath, cooled and extracted with methylene chloride; the extract was washed with dilute hydrochloric acid, water, saturated sodium bicarbonate solution and again with water, dried over anhydrous sodium sulfate and the solvent was evaporated. Recrystallization of the residue from acetone-hexane produced 16α-methyl-6α-fluoro-prednisone 21-cyclopentylpropionate.

EXAMPLE XXVII

By following the method described in the previous example, 16α - methyl - 6α,9α - difluoro - hydrocortisone 21-acetate was oxidized to 16α-methyl-6α,9α-difluoro-cortisone 21-acetate and the latter was dehydrogenated to form 16α-methyl-6α,9α-difluoro-prednisone 21 - acetate, which was then hydrolyzed to the free 16α-methyl-6α,9α-difluoro-prednisone; by treatment of 1 g. of the latter with 2 cc. of propionic anhydride in 10 cc. of pyridine for 2 hours at room temperature, followed by precipitation with water and purification by crystallization from acetone-hexane, there was obtained 16α-methyl-6α,9α-difluoro-prednisone 21-propionate.

We claim:
1. A compound of the following formula:

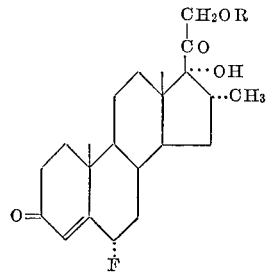

wherein R is selected from the group consisting of hydrogen and a hydrocarbon carboxylic acyl group of less than 12 carbon atoms.

2. 16α - methyl - 6α - fluoro - Δ⁴ - pregnen - 17α,21-diol-3,20-dione.

3. The 21-mono hydrocarbon carboxylic acid esters of less than 12 carbon atoms of 16α-methyl-6α-fluoro-Δ⁴-pregnan-17α,21-diol-3,20-dione.

4. A compound of the following formula:

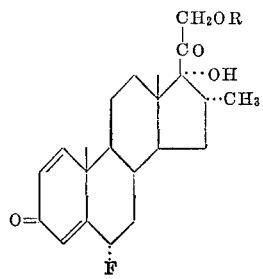

wherein R is selected from the group consisting of hydrogen and a hydrocarbon carboxylic acyl group of less than 12 carbon atoms.

5. 16α - methyl - 6α - fluoro - Δ$^{1,4}$ - pregnadien-17α,21-diol-3,20-dione.

6. The hydrocarbon carboxylic acid esters of less than 12 carbon atoms of 16α-methyl-6α-fluoro-Δ$^{1,4}$-pregnadien-17α,21-diol-3,20-dione.

7. 16α - methyl - 6α - fluoro - Δ⁴ - pregnen - 17α,21-diol-3,20-dione 21-acetate.

8. 16α - methyl - 6α - fluoro - Δ$^{1,4}$ - pregnadien-17α,21-diol-3,20-dione 21-acetate.

References Cited

UNITED STATES PATENTS

| | | | |
|---|---|---|---|
| 2,838,497 | 6/1958 | Spero et al. | 260—239.55 |
| 2,838,498 | 6/1958 | Magerlein et al. | 260—239.55 |
| 2,838,499 | 6/1958 | Spero et al | 260—239.55 |
| 2,841,600 | 7/1958 | Hogg et al. | 260—397.45 |

OTHER REFERENCES

Arth et al.: J. Am. Chem. Soc., vol. 80, pp. 3160–62 (1958).

ELBERT L. ROBERTS, Primary Examiner

U.S. Cl. X.R.

260—239.55, 397.45

UNITED STATES PATENT OFFICE
CERTIFICATE OF CORRECTION

Patent No. 3,538,131          Dated November 3, 1970

Inventor(s) Howard J. Ringold, Carl Djerassi, John A. Edwards

It is certified that error appears in the above-identified patent and that said Letters Patent are hereby corrected as shown below:

The first 3 formulas in Columns 3 and 4 should appear as follows:

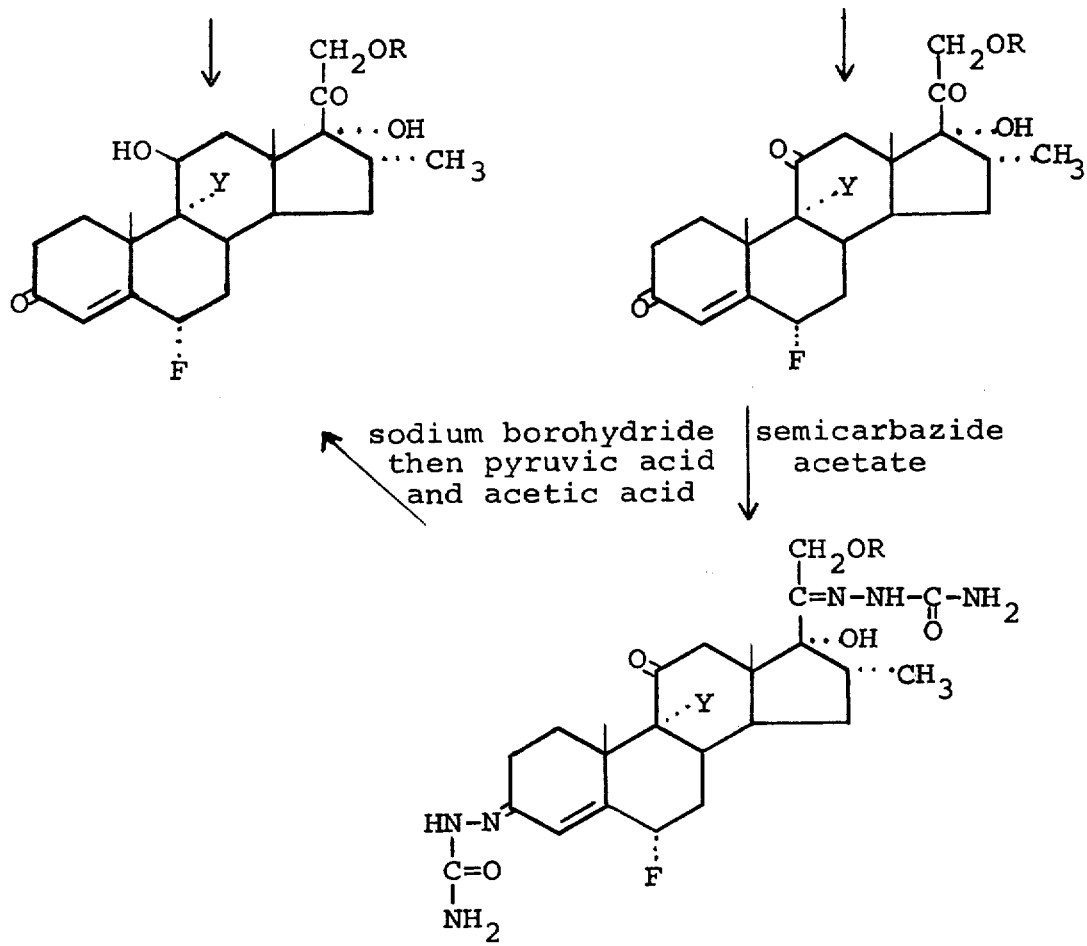

UNITED STATES PATENT OFFICE
CERTIFICATE OF CORRECTION

Patent No. 3,538,131                     Dated November 3, 1970

Inventor(s) Howard J. Ringold, et al.     Page -2-

It is certified that error appears in the above-identified patent and that said Letters Patent are hereby corrected as shown below:

In Column 8, the second formula should appear as follows:

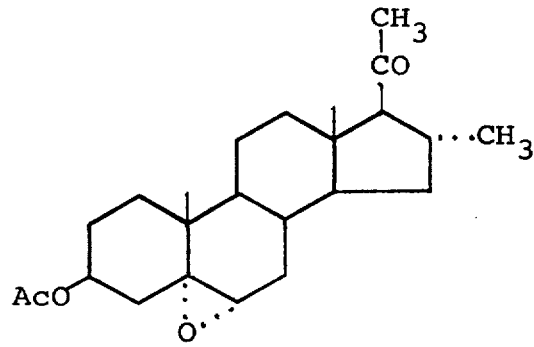

Column 18, line 20, "fluoro-21-deoxycortisone" should be -- fluoro-21-desoxycortisone --.
Column 19, line 50, after "acetic" insert -- acid --.
Column 20, line 37, "as" should be -- was --.
Column 20, line 47, "ere" should be -- were --.

Column 24, line 22, after "6α-fluoro-" and before "-acetate," insert -- hydrocortisone --.
Column 25, line 8 (Claim 3), "pregnan-" should be -- pregnen --

Signed and sealed this 18th day of July 1972.

(SEAL)
Attest:

EDWARD M. FLETCHER, JR.            ROBERT GOTTSCHALK
Attesting Officer                  Commissioner of Patents